Jan. 19, 1932.  G. GRIFFITH  1,842,324
LAMINATED PRODUCT BEARING LENS LIKE ELEMENTS OVER EXTENDED AREAS
Filed Dec. 10, 1928
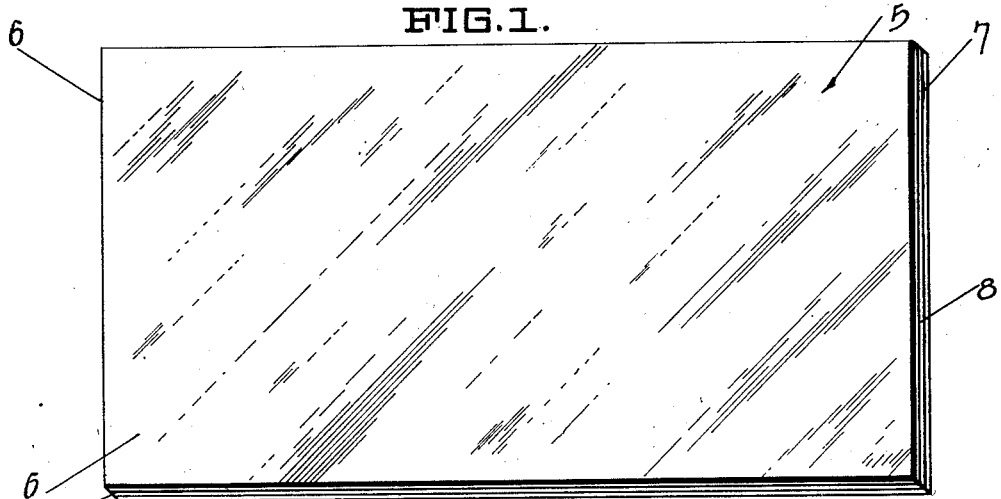
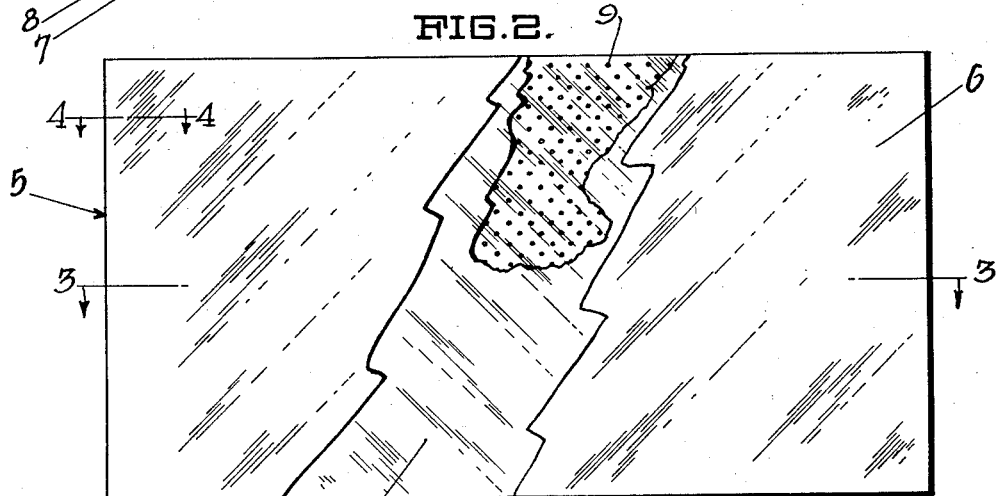
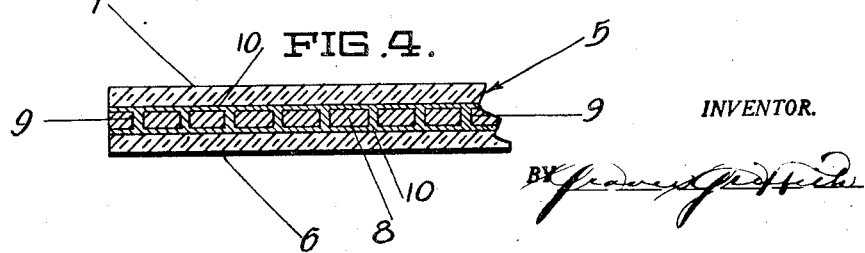
INVENTOR.

Patented Jan. 19, 1932

1,842,324

UNITED STATES PATENT OFFICE

GRAVES GRIFFITH, OF SAN FRANCISCO, CALIFORNIA, ASSIGNOR TO GRIFFITH CAMERA CORPORATION, LTD., OF SAN FRANCISCO, CALIFORNIA, A CORPORATION OF CALIFORNIA

LAMINATED PRODUCT BEARING LENS-LIKE ELEMENTS OVER EXTENDED AREAS

Application filed December 10, 1928. Serial No. 324,932.

The present invention relates to improvements in laminated products, and more particularly to those constituted exteriorly of sheets of glass having therebetween an element of celluloid character.

Primarily, the object of the invention is to provide a laminated product of the character designated wherein one of the sheets is made to carry an innumerable number of pin-point perforations serving as so many lenses distributed over and extended area for parallel ray transmission, the sheet being transparent, translucent or opaque character and of any color desired.

A further object of the invention is the provision of a laminated product of the character described wherein the thus prepared sheet is made to bear, in perforated outlines adaptable for illumination, signs, symbols, letters, numerals, and such like characters, by blocking-out their forms and opaquing the surrounding surface, leaving these as transparencies constituted of innumerable lenses.

Another object of the invention is the provision of a product of the class designated adaptable, through its innumerable and minute perforations as borne by its perforated element, for lens-like action in the transmission of light, the minuteness of these perforations causing them to assume the properties of so many lenses of the pin-point type covering extended areas and adapted for directing the light rays transmitted by them in near parallellism, a property enabling transparencies embodying this feature to be seen with distinctness at much greater distances than would be possible if they were of the ordinary construction.

An additional object of the invention is to provide a laminated product of the character described that is adaptable for use as a dimmer, through rendering the rays of light transmitted by them substantially parallel, thereby eliminating the disconcerting and discomfort-glare accompanying the usually highly concentrated rays.

Supplementary to the foregoing is that of supplying a laminated product of the class designated that is adaptable for use as a scanning disc in television apparatus, the perforated sheet, in this instance, being opaque and between transparent sheets.

Though a preferred construction employing sheets of glass provided with a perforated sheet of celluloid is herein shown and described, it is obvious that other materials mays be employed, if these be possessed of the necessary transparency, translucency and color properties, in such association as to meet particular requirements, as, for instance, the outer sheets may be of any transparent material, and the inner perforated reinforcing sheet of any suitable material and color and of transparent, translucent or opaque character.

In the preparation of the interior sheet of the laminated product, any sheet of suitable non-brittle material is taken and run through a perforating machine provided with regularly spaced dies of a size to give minute perforations not to exceed a pin-point puncture. After properly coating both sides with any transparent cement of the required character, the sheet is placed between two sheets of glass or like material and sufficient force applied to force the cement through the perforations, filling these and serving as anchorage means between the two surface sheets and the intervening perforated sheet and to bind and cement the three firmly and compactly together, the while subjecting the whole to a temperature sufficient to insure the perfect setting of the cement and complete adhesion of the constituent elements of the laminated product.

The efficiency of the laminated product as a lens-like body of extended area is wholly dependent upon the size of the perforations, the lens-like qualities of these perforations decreasing with their increase in size, until a point is reached at which the transmitted rays of light become so criss-crossed just without the outer surface of the laminated product as to present the appearance of a uniformly luminous surface, a condition the contrary of that sought and desired, which is, that the minute pin-point punctures, acting as so many lenses, direct the rays of light passing through them in substantially parallel courses, an advantage of which is that characters and indicia bearing these minute perforations as their body or outline are clearly discernable at much greater distances than they are when of ordinary transparency character, or when the perforations are of extreme size.

In the accompanying drawings, forming a part of this specification, and in which similar characters of reference refer to like parts, throughout:

Figure 1 is a perspective view of a laminated product constructed in accordance with the requirements of my invention, in which are shown the two outer sheets of transparent material, the inner perforated sheet of any desired color and degree of opacity, and the transparent cement uniting these three sheets into one compact body constituting the laminated product;

Figure 2 is a section of the laminated product, showing the character and arrangement of the constituent elements, sheet of glass, and an intermediate perforate sheet, in which portions of successive sheet layers have been broken away the better to expose the relation of the different sheets;

Figure 3 is a cross-section of the lens-bearing laminated product embodying the principles of my invention, and wherein is shown the order of arrangement of the various elements entering into its construction, the section being indicated by the line 3—3 in Figure 2; and Figure 4 is an enlarged cross-sectional detail taken on the line 4—4 in Figure 2.

Referring more particularly, and in detail, to the drawings, 5, in a general way, represents a sheet of the laminated product, of which 6 and 7 are the exterior sheets of transparent material, 8 the interior perforated sheet of any desired color and degree of opacity, 9 the minute perforations borne by the interior sheet, and 10 the transparent resinous cement of Canadian balsam, or of Canadian balsam character, used in effecting the union of the three sheets and the filling of the perforations.

The laminated product, as herein provided for, lends itself particularly well to sign construction where increased visibility at distance is desired, since, the indicia being of a transparent character, with bodies constituted of numerous minute lenses functioning to direct all rays of light passing therethrough in courses substantially in parallelism with each other, there is insured against all possibility of blending and intermingling of these rays until a considerable distance has been reached beyond the point of their origin.

Obviously, though this laminated product, as manufactured, would provide a reinforced laminated glass the equal in every respect to any of those of that character now on the market, it is not the intent to have it thus restricted, the purpose being rather to supply a laminated product providing a surface of extended area bearing numerous minute regularly disposed elements serving to afford both binding means and as agents for lens-like action, thus making it an optical element, with the laminated feature both subsidiary and essential thereto.

As is apparent, with a laminated product manufactured after the manner herein provided for, that is with the perforated sheet of opaque, or translucent material of any desired color, and with the surfacing sheets transparent, designs of any character may be laid-out as transparencies and the intervening surface opaqued, thus providing for a diversity of applications; or the plain laminated sheets may be utilized as headlight and windshield dimmers, wherein the parallelism of the rays of light as therein provided for serve to get away from the concentrated light from a luminous point; or as a scanning screen in television projection, wherein the scanning means is made to include lens elements dispersed over selected areas.

Having thus described my invention, I claim, and desire to secure by Letters Patent:

1. A laminated glass consisting of two sheets of transparent material having therebetween a binding means comprising a translucent sheet of perforated material and a liquid cement, said cement being of transparent character and adapted to fill said perforations and bind the whole into an homogeneous sheet-product of mutiple lens-like structure when subjected to pressure and temperature.

2. A laminated product comprising two sheets of transparent material, a sheet of translucent material secured between said sheets of transparent material, said sheet of translucent material having a large number of pinhole perforations therethrough.

3. A laminated product comprising two sheets of glass, a sheet of celluloid positioned between said sheets of glass and in contact therewith, said sheet of celluloid having a large number of pinhole perforations therethrough.

4. A laminated product comprising two sheets of transparent material, a sheet of translucent material between said sheets of transparent material, said sheet of translucent material having a large number of pinhole perforations therethrough, and a layer of transparent cementitious material securing both sides of said translucent material to said sheets of transparent material.

5. A laminated product comprising two sheets of transparent material, a sheet of colored translucent material being positioned between said sheets of transparent material and in contact therewith, said sheet of translucent material having a large number of pinhole perforations therethrough, and a layer of transparent cementitious material on both sides of said layer of colored translucent material whereby said layer of colored translucent material is secured to said sheets of transparent material.

6. A laminated product comprising two sheets of glass, a sheet of colored celluloid positioned between and in contact with said sheets of glass, and a layer of transparent cementitious material on both sides of said sheet of celluloid whereby said sheet of celluloid is secured to said sheets of glass, said sheet of celluloid having a large number of pinhole perforations therethrough.

7. A laminated product comprising two sheets of transparent material, a sheet of translucent material positioned between said sheets of transparent material, said sheet of translucent material having a large number of pinhole perforations therethrough, and a coating of cementitious material on both sides of said sheet of translucent material, said cementitious material filling the perforations and securing said sheet of translucent material to said sheets of transparent material.

In testimony whereof I hereunto affix my signature.

GRAVES GRIFFITH.